United States Patent

Tola et al.

[54] SNAP-FIT INTEGRATED WHEEL SPEED SENSOR ASSEMBLY

[75] Inventors: Jeffry Tola, Bloomfield; David John McArdle, Royal Oak, both of Mich.

[73] Assignee: ITT Manufacturing Enterprises, Inc., Wilmington, Del.

[21] Appl. No.: 08/858,263

[22] Filed: May 19, 1997

[51] Int. Cl.[6] .................................. G01P 3/48; G01P 3/54; F16C 32/00; F16C 41/04

[52] U.S. Cl. ....................... 324/173; 324/207.25; 384/448

[58] Field of Search ..................................... 324/173, 174, 324/207.25; 384/448; 188/181 R; 73/866.5

[11] Patent Number: 5,920,193

[45] Date of Patent: Jul. 6, 1999

[56] References Cited

U.S. PATENT DOCUMENTS 5,756,894  5/1998  Paolo et al. ............................. 324/174

*Primary Examiner*—Walter E. Snow
*Attorney, Agent, or Firm*—Rader, Fishman & Gauer PLLC

[57] ABSTRACT

A snap fit integrated wheel speed sensor assembly consists of a dust cap which is mounted over the end of a vehicle bearing assembly. The dust cap has an integral sensor-receiving cavity. A vehicle wheel speed sensor is positioned inside of the receiving cavity. A snap ring functions as a compression spring to engage the wheel speed sensor and the sensor-receiving cavity so that the sensing assembly remains stationary in the sensor-receiving cavity while permitting quick, easy and efficient installation and removal of the wheel speed sensor.

5 Claims, 4 Drawing Sheets

SNAP-FIT INTEGRATED WHEEL SPEED SENSOR ASSEMBLY

TECHNICAL FIELD

This invention relates to devices for measuring the rotary motion of vehicle wheels and more particularly to a mechanism for mounting vehicle wheel speed sensing devices.

BACKGROUND OF THE INVENTION

Measuring rotary motions, and, in particular, the speed and the rotational behavior of individual wheels on a vehicle is of great importance in connection with automotive vehicle control systems such as systems for anti-lock control brake systems, traction slip control, and suspension control, etc. Sensors for these types of applications must be durable, reliable, inexpensive to manufacture, and easy to assemble, diagnose, replace, and maintain.

To position a sensor relative to a vehicle wheel, the sensor is typically integrated into a dust cap which is mounted over the end of the vehicle's bearing assembly. The dust cap not only protects the vehicle bearing and its components from damage, it also provides a method of positioning and securing the wheel speed sensor relative to the vehicle wheel so that it can monitor and measure the wheel's rotational speed. Usually a tone wheel, having parallel windows or gear teeth or some other position-identifying features, is fixedly attached to the vehicle shaft and positioned in the interior cavity of the dust cap. The wheel speed sensor is located relative to the tone wheel so as to sense the speed of the rotating parallel windows, gear teeth, or other position-identifying features of the tone wheel. The wheel speed sensor is typically mounted to the dust cap with a bolt or is integrally molded into the dust cap.

Wheel speed sensors can malfunction from time to time, requiring them to be serviced or replaced. Whether wheel speed sensors are attached to the dust cap with a bolt or are integrally molded into the dust cap, servicing of the sensors requires that the dust cap be removed from the shaft. Removal of the dust cap requires the disassembling of several components, and disturbs the bearing assembly, exposing it to possible damage. Moreover, the dust cap is invariably damaged during disassembly and requires replacement after the wheel speed sensor is serviced.

SUMMARY OF THE INVENTION

It is an object of this invention to provide an integrated vehicle wheel speed sensor assembly having a mounting mechanism that facilitates quick and easy assembly and disassembly. This object is accomplished by using a molded dust cap having a sensor-receiving cavity for accepting and mounting a wheel speed sensor. A snap ring or compression spring is fitted around the circumference of the receiving cavity, and the curved sides of the snap ring protrude through two open channels on the sensor-receiving cavity so that the curved sides are exposed on the interior of the sensor-receiving cavity. The snap ring has a pressure-receiving side, which when an operator applies a mild pressure, such as with his/her finger, the curved sides of the snap ring bend outward and no longer protrude through the channels. With the snap ring out of the interior of the receiving cavity, a wheel speed sensor having two slots on opposite sides is fitted inside of the receiving cavity. When the operator releases the pressure from the snap ring, the sides of the snap ring return to the interior of the receiving cavity and engage the slots on the sensor, locking it into place. An O-ring is positioned in contact with both the sensor and the receiving cavity so as to seal the opening of the receiving cavity and to provide extra stability for the sensor.

Whenever the sensor requires servicing, the sensor can be removed quickly and easily without damaging the dust cap by applying pressure to the pressure-receiving side of the snap ring. The pressure forces the curved sides of the snap ring outward, which causes the sides of the snap ring to disengage the slots of the sensor. Then, the sensor can be easily slid out of the receiving cavity.

The above and other objects and features of the present invention will become apparent from the following detailed description of the preferred embodiments when taken in conjunction with reference to the accompanying drawings.

DETAILED DESCRIPTION OF THE INVENTION

Figure 1:
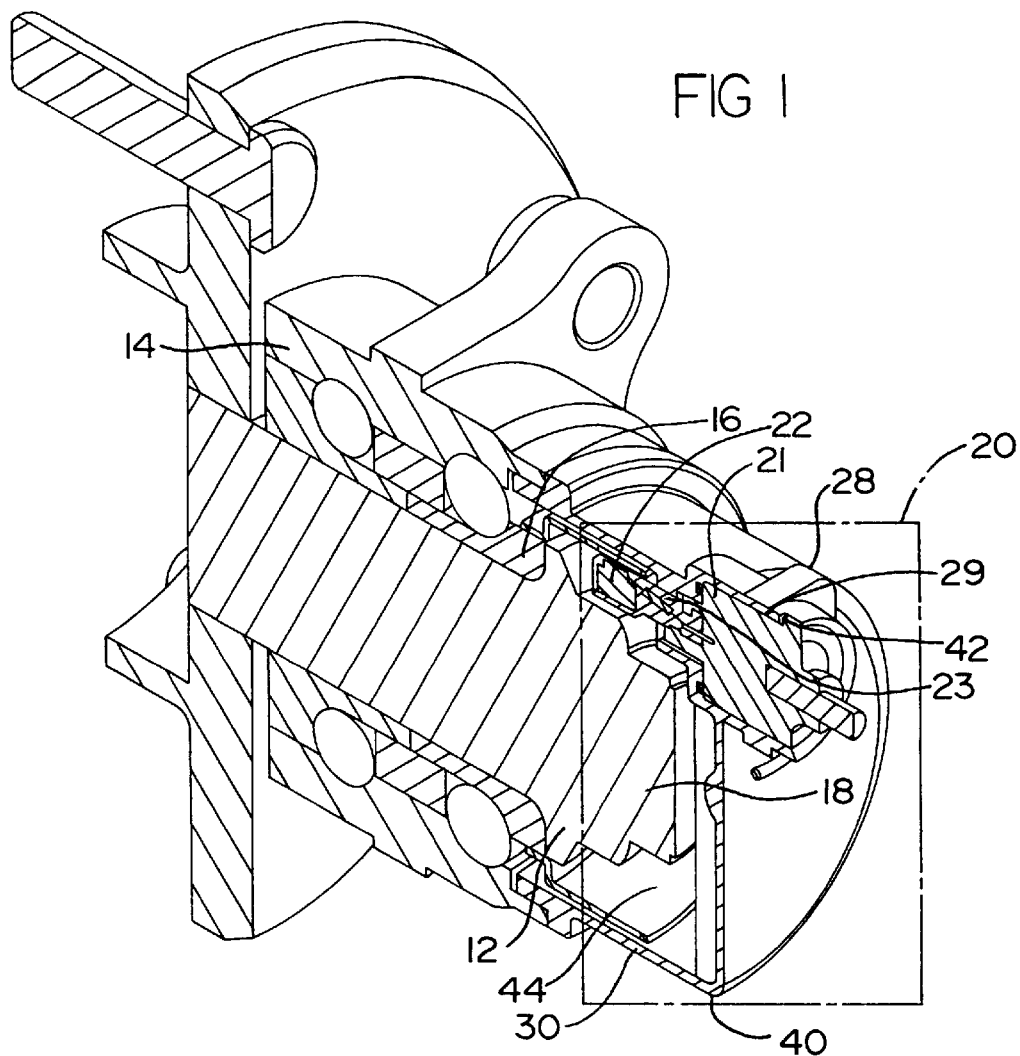
FIG. 1 is a perspective view of the snap fit integrated wheel speed sensor assembly, including its operational environment.
Figure 2:
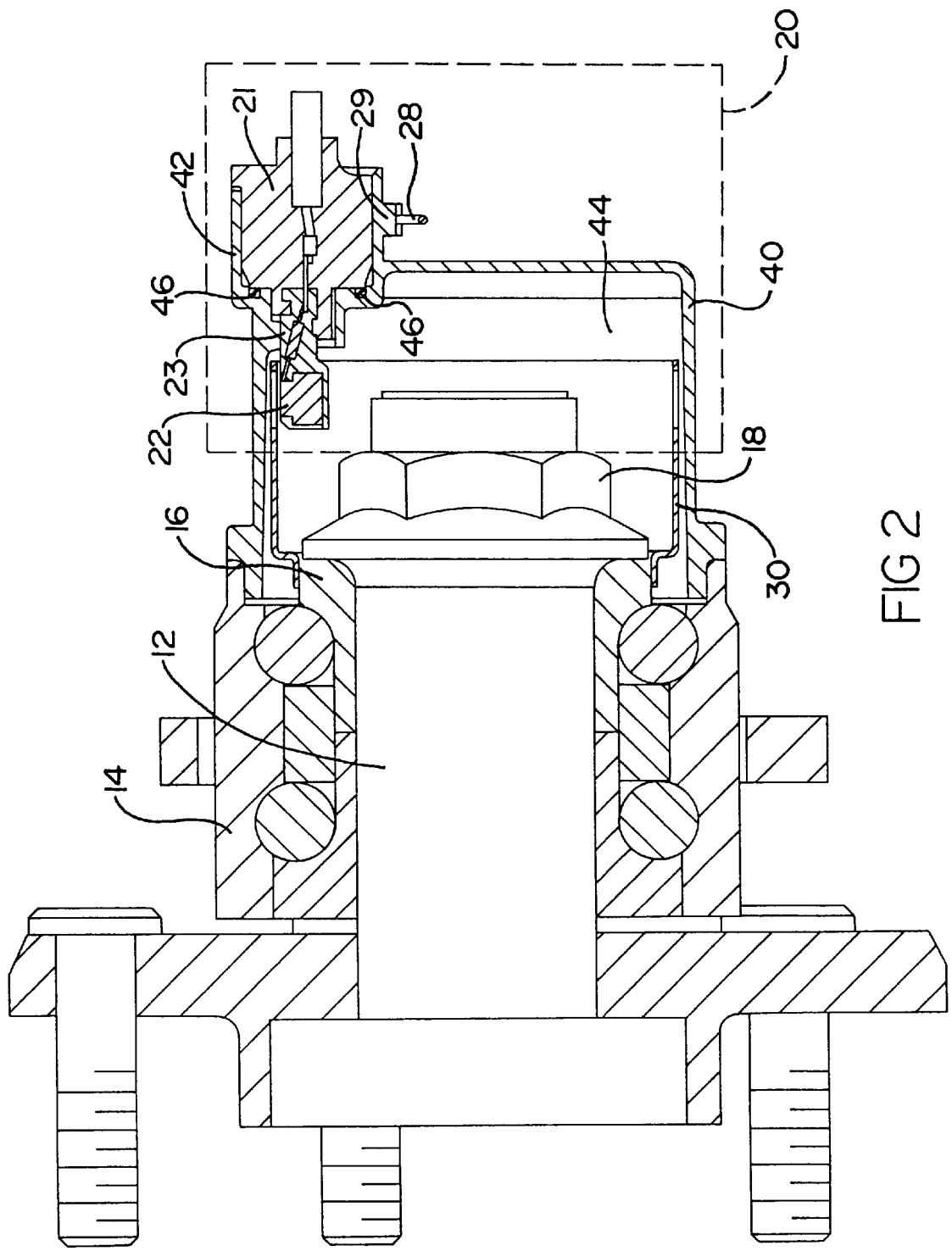
FIG. 2 is a cross-sectional side view of the snap fit integrated wheel speed sensor assembly, including its operational environment.

In accordance with FIG. 1 and 2, vehicle bearing assembly includes shaft 12, outer race 14, inner race 16, nut 18, and snap fit integrated wheel speed sensor assembly 20. Sensor assembly 20 comprises wheel speed sensor 21, snap ring 28, tone wheel 30, and dust cap 40. Dust cap 40 includes sensor-receiving cavity 42, interior cavity 44 and passage 23 connecting receiving cavity 42 and interior cavity 44. Sensor-receiving cavity 42 includes channels 29. O-ring 46 is positioned inside of receiving cavity 42.

Figure 3:
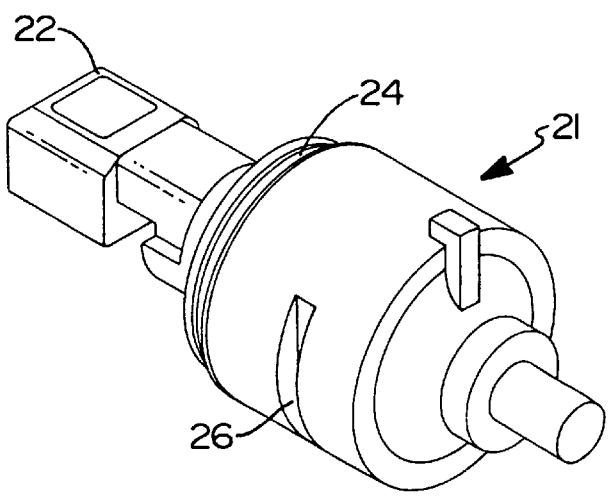
FIG. 3 is a perspective view of the vehicle wheel speed sensor.
Figure 4:
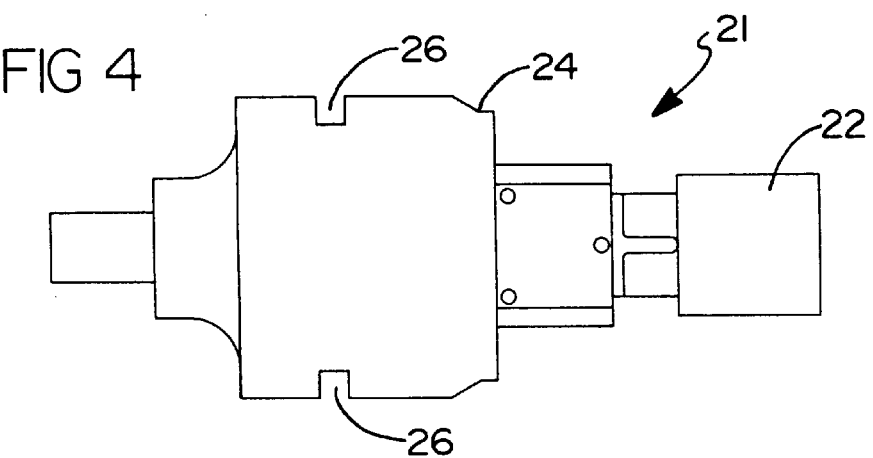
FIG. 4 is a side view of the vehicle wheel speed sensor.
Figure 5:
FIG. 5 is a front view of the snap ring.
Figure 6:
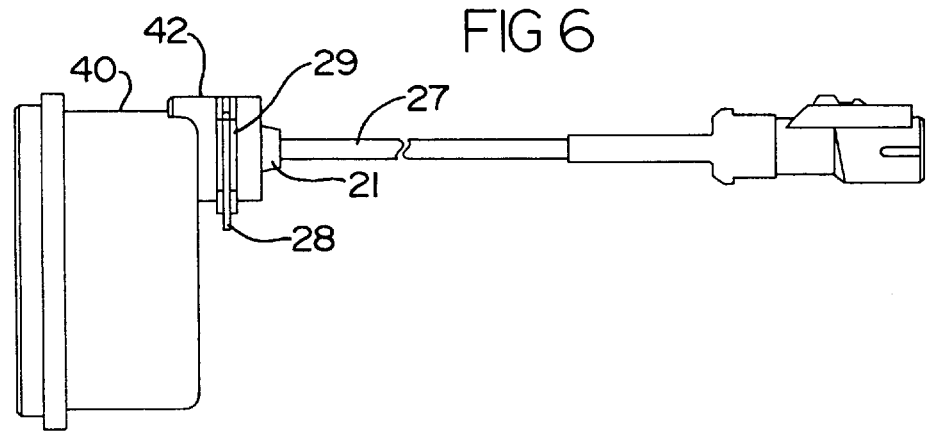
FIG. 6 is a side view of snap fit integrated wheel speed sensor assembly.
Figure 7A:
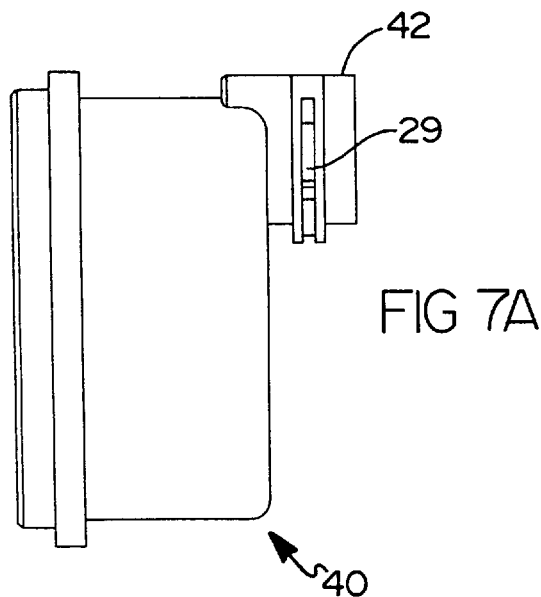
FIG. 7A is a side view of the dust cap.
Figure 7B:
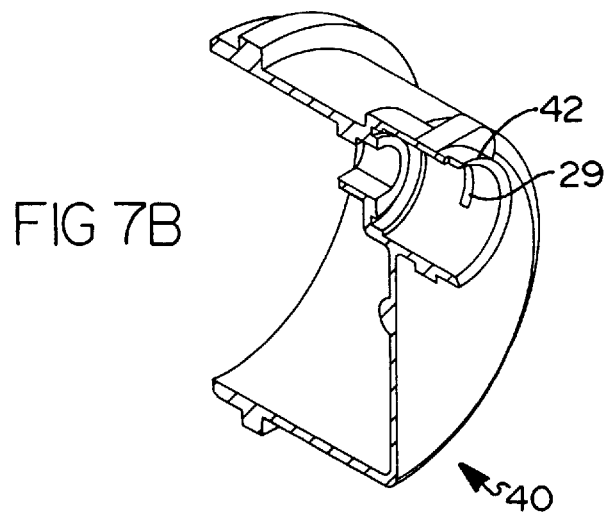
FIG. 7B is a perspective view of the dust cap.

In accordance with FIG. 3 and 4, wheel speed sensor 21 includes sensor probe 22, O-ring seat 24, and slots 26. FIG. 5 shows a front view of snap ring 28. Snap ring 28 includes engaging sides 27 and pressure-receiving side 25. In accordance with FIG. 6, snap ring 28 engages channels 29 on receiving cavity 42, which is integral with dust cap 40. Cable 27 connects to wheel speed sensor 21 and permits electrical communication between wheel speed sensor 21 and a microprocessor (not shown). FIG. 7A and 7B show clearly dust cap 40 and channels 29 on sensor-receiving cavity 42.

In operation, tone wheel 30 is fixedly attached to shaft 12 so that tone wheel 30 rotates at the same speed as shaft 12. Dust cap 40 is positioned over tone wheel 30 so that tone wheel 30 freely rotates inside of interior cavity 44 of dust cap 40. The disclosed invention will operate equally well with any well-known tone wheel configuration, including without limitation well-known gear teeth, parallel window, stamped wave-form window, and magnetic encoder type tone wheels.

Sensor-receiving cavity 42 is integrally molded as part of dust cap 40. Sensor-receiving cavity 42 includes two open channels 29 on opposite sides of sensor-receiving cavity 42. Snap ring 28 is a compression spring which fits around and is biased against the outer surface of sensor-receiving cavity 42. Snap ring 28 has two curved engaging sides 27 which fit into channels 29 of sensor-receiving cavity 42 and protrude into the interior of sensor-receiving cavity 42. The compression bias of snap ring 28 maintains a snug fit around sensor-receiving cavity 42 and in channels 29. Snap ring 28 may be constructed of stainless steel or any other rigid, resilient material appropriate for compression springs. When an operator applies pressure with his/her finger to pressure-receiving side 25, engaging sides 27 are forced against the edge of channels 29 in such a manner so that engaging sides 27 are biased opposite the compression tension of snap ring 28, away from and out of the interior of sensor-receiving cavity 42.

Wheel speed sensor 21 is positioned inside of receiving cavity 42. O-Ring 46 is compressed between the inside wall of receiving cavity 42 and O-ring seat 24. Sensing probe 22 extends through passage 23 and is positioned adjacent to either the exterior or the interior side of tone wheel 30, depending on whether the position-identifying features from which sensing probe 22 receives rotational speed data are located on the interior or exterior side of tone wheel 30. In the preferred embodiment, the position-identifying features are located on the interior surface of tone wheel 30, and therefore, sensing probe 22 is positioned adjacent to the interior surface of tone wheel 30. Thus, sensing probe 22 is positioned to read the rotational speed of tone wheel 30, and the rest of wheel speed sensor 21 is housed in receiving cavity 42.

Engaging sides 27 of snap ring 28, protruding through channels 29 of receiving cavity 42, engage with slots 26 on wheel speed sensor 21. The engagement of engaging sides 27 through channels 29 and with slots 26 secure wheel speed sensor 21 inside of receiving cavity 42. O-ring 24 seals the interface between wheel speed sensor 21 and the interior wall of sensor-receiving cavity 42. Because O-ring 24 is compressed when wheel speed sensor 21 is positioned in receiving cavity 42, O-ring 24 also provides an expansion force against wheel speed sensor 21 to provide a lateral force against the engagement of engaging sides 27 and slots 26 to further secure wheel speed sensor 21 inside of sensor-receiving cavity 42.

The ability to expand engaging sides 27 of snap ring 28 so as to disengage with slots 26 of wheel speed sensor 21 permits sensor 21 to be installed into and removed from sensor-receiving cavity 42 quickly, easily, and without the necessity for tools. Furthermore, sensor 21 can be removed without disturbing dust cap 40. Thus, the serviceability of sensor 21 is greatly enhanced, increasing not only the efficiency of servicing sensor 21 but also reducing the cost associated with replacing dust cap 40. Moreover, since dust cap 40 remains in place, the vehicle's bearing assembly remains protected during servicing.

An additional benefit of the disclosed invention is that the positioning of sensing probe 22 adjacent the interior side of tone wheel 30 permits optimal signal generation by sensor 22. This is because the quality of the signal generated by sensor 22 is directly related to the size of the windows, teeth or other position-identifying features located on the surface of tone wheel 30. The greater the diameter of tone wheel 30, the greater the size of the position-identifying features and therefore the better the quality of the signal generated by sensing probe 22. Thus, locating sensing probe 22 adjacent the interior side of tone wheel 30, instead of adjacent the exterior side, allows sensing probe 22 to generate a more reliable signal.

The preceding description is exemplary rather than limiting in nature. A preferred embodiment of this invention has been disclosed to enable one skilled in the art to practice this invention. Variations and modifications are possible without departing from the spirit and purview of this invention, the scope of which is limited only by the appended claims.

We claim:

1. A vehicle wheel speed sensor assembly, comprising:
a dust cap having an integral sensor-receiving cavity;
one or more channels associated with said sensor-receiving cavity for receiving a snap ring and permitting an engaging side of said snap ring to selectively protrude into said sensor-receiving cavity;
a vehicle wheel speed sensor positioned in said sensor-receiving cavity, said wheel speed sensor including one or more slots for engagement with said snap ring when said snap ring protrudes into said sensor receiving-cavity; and
a pressure-receiving side located on said snap ring whereby a force exerted against said pressure-receiving side causes said engaging side of said snap ring to expand outwardly away from said sensor-receiving cavity and permits said wheel speed sensor to be installed into and removed from said sensor-receiving cavity without the necessity for tools.

2. A vehicle wheel speed sensor assembly, comprising:
a dust cap having an integral sensor-receiving cavity;
a plurality of channels associated with said sensor-receiving cavity for receiving a snap ring and permitting engaging sides of said snap ring to selectively protrude into said sensor-receiving cavity;
a vehicle wheel speed sensor positioned in said sensor-receiving cavity, said wheel speed sensor including a plurality of slots for corresponding engagement with said snap ring when said snap ring protrudes into said sensor receiving-cavity;
a pressure-receiving side located on said snap ring whereby a force exerted against said pressure-receiving side causes said engaging sides of said snap ring to expand outwardly away from said sensor-receiving cavity and allow movement of said wheel speed sensor relative to said sensor-receiving cavity;
an O-ring seat formed on said wheel speed sensor; and
an O-ring located on said O-ring seat for sealing an interface between said dust cap and said wheel speed sensor and wherein said O-ring provides an expansion force against said wheel speed sensor to provide a lateral force against said engaging sides and said slots to further secure said wheel speed sensor.

3. The vehicle wheel speed sensor assembly in claim 1, further comprising;
an O-ring;
wherein said wheel speed sensor comprises an O-ring seat; and
wherein said O-ring is positioned against said O-ring seat.

4. The vehicle wheel speed sensor assembly in claim 1, wherein said dust cap comprises an interior cavity;
wherein said wheel speed sensor comprises a sensing probe;
said vehicle wheel speed sensor assembly further comprises a passage between said sensor-receiving cavity and said interior cavity, said sensing probe extending through said passage into said interior cavity; and
a tone wheel having an exterior surface and an interior surface positioned in said interior cavity.

5. The vehicle wheel speed sensor assembly in claim 4, wherein said sensing probe is positioned adjacent to said interior surface of said tone wheel.

* * * * *